(12) United States Patent
Vegh (10) Patent No.: US 9,122,130 B1
(45) Date of Patent: Sep. 1, 2015

(54) CABLE TRAVERSING CAMERA CARRYING DEVICE

(71) Applicant: Dennis J. Vegh, Mesa, AZ (US)

(72) Inventor: Dennis J. Vegh, Mesa, AZ (US)

( * ) Notice: Subject to any disclaimer, the term of this patent is extended or adjusted under 35 U.S.C. 154(b) by 419 days.

(21) Appl. No.: 13/683,935

(22) Filed: Nov. 21, 2012

(51) Int. Cl.
| | |
|---|---|
| *F16M 11/42* | (2006.01) |
| *G03B 17/56* | (2006.01) |
| *B66D 3/02* | (2006.01) |
| *B66D 3/04* | (2006.01) |
| *G08B 13/196* | (2006.01) |

(52) U.S. Cl.
CPC ............... *G03B 17/561* (2013.01); *B66D 3/02* (2013.01); *B66D 3/04* (2013.01); *F16M 11/425* (2013.01); *G08B 13/19632* (2013.01)

(58) Field of Classification Search
USPC .............................. 352/243, 34; 212/76–123; 348/143–147, 157, 159; 396/7, 9, 12, 396/13, 419, 427; 248/317, 323, 328, 329
See application file for complete search history.

(56) References Cited

U.S. PATENT DOCUMENTS

| | | | | |
|---|---|---|---|---|
| 5,224,426 | A * | 7/1993 | Rodnunsky et al. | 104/112 |
| 5,440,476 | A * | 8/1995 | Lefkowitz et al. | 700/56 |
| 2004/0206715 | A1* | 10/2004 | Rodnunsky | 212/76 |
| 2005/0087089 | A1* | 4/2005 | Rodnunsky | 104/112 |
| 2007/0056463 | A1* | 3/2007 | Rodnunsky | 104/173.1 |
| 2009/0207250 | A1* | 8/2009 | Bennett et al. | 348/144 |
| 2013/0050652 | A1* | 2/2013 | Wharton | 352/34 |

\* cited by examiner

*Primary Examiner* — William C Dowling
(74) *Attorney, Agent, or Firm* — Schmeiser, Olsen & Watts LLP (57) ABSTRACT

A cable traversing camera carrying device is provided having a manifold and a camera carriage coupled to the manifold. The manifold includes a first side plate and a second side plate. The manifold also includes two idler pulleys coupled between the first and second side plates located at opposing sides of the manifold and adjacent the top side of manifold. The manifold further includes a drive pulley coupled between the first and second side plates operatively engaged by a remotely activated and controlled motor. The drive pulley is located in a middle portion of the manifold below a line defined between axes of the two idler pulleys. The two idler pulleys and the drive pulley are adjustable to adjust the tension in a cable operatively extending through and engaging the idler pulleys and the drive pulley.

19 Claims, 7 Drawing Sheets

CABLE TRAVERSING CAMERA CARRYING DEVICE

BACKGROUND OF THE INVENTION

1. Technical Field

This invention relates generally to a camera carrying device and more particularly to a cable traversing camera carrying device.

2. State of the Art

Cameras are often used in conjunction with cables in order to obtain images and/or video from an aerial perspective. Conventionally, these cable systems have various numbers of cables and a carriage attached to the cables. Further, these conventional systems move the camera by use of the cables, wherein some of the cables pull the carriage along another cable or even just the cables themselves are statically connected to the carriage and move the carriage as the cables are wound and/or unwound. These systems require many additional components and features in order to properly operate the system to shoot pictures and video.

Accordingly, there is a need in the field of cable traversing camera carrying devices for an improved device that can travel along a cable while allowing the camera to function properly.

SUMMARY OF THE INVENTION

The present invention relates to a cable traversing camera carrying device having a manifold that engages a cable and moves along the cable and further the manifold couples to a camera carriage to carry a camera.

According to some embodiments of the present invention, a cable traversing camera carrying device comprises a manifold and a camera carriage coupled to the manifold. The manifold further includes a first side plate and a second side plate; two idler pulleys, each coupled to opposing sides of the manifold and adjacent the top side of manifold; and a drive pulley operatively engaged by a remotely activated and controlled motor. The drive pulley is located in a middle portion of the manifold below a line defined between axes of the two idler pulleys. The two idler pulleys and the drive pulley are adjustable to adjust the tension in a cable operatively extending through and engaging the idler pulleys and the drive pulley.

In other embodiments, the camera carriage is a gimbal to maintain a desired orientation as the carrying device traverses the cable.

Further, in other embodiments, the present invention includes a method of using a cable traversing camera carrying device. The method comprises providing a cable traversing camera carrying device; operatively couple the cable traversing camera carrying device to a cable; repeatably and removably couple a camera that is operatively coupled to the carrying device; remotely activating a motor to rotate in a first direction, wherein the carrying device traverses the cable in a first direction in response to the motor rotating in the first direction; and remotely activating a motor to rotate in a second direction, wherein the carrying device traverses the cable in a second direction in response to the motor rotating in the first direction.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures.

DETAILED DESCRIPTION OF EMBODIMENTS OF THE INVENTION

As discussed above, embodiments of the present invention relate to a cable traversing camera carrying device having a manifold that engages a cable and moves along the cable and further the manifold couples to a camera carriage to carry a camera.

Figure 1:
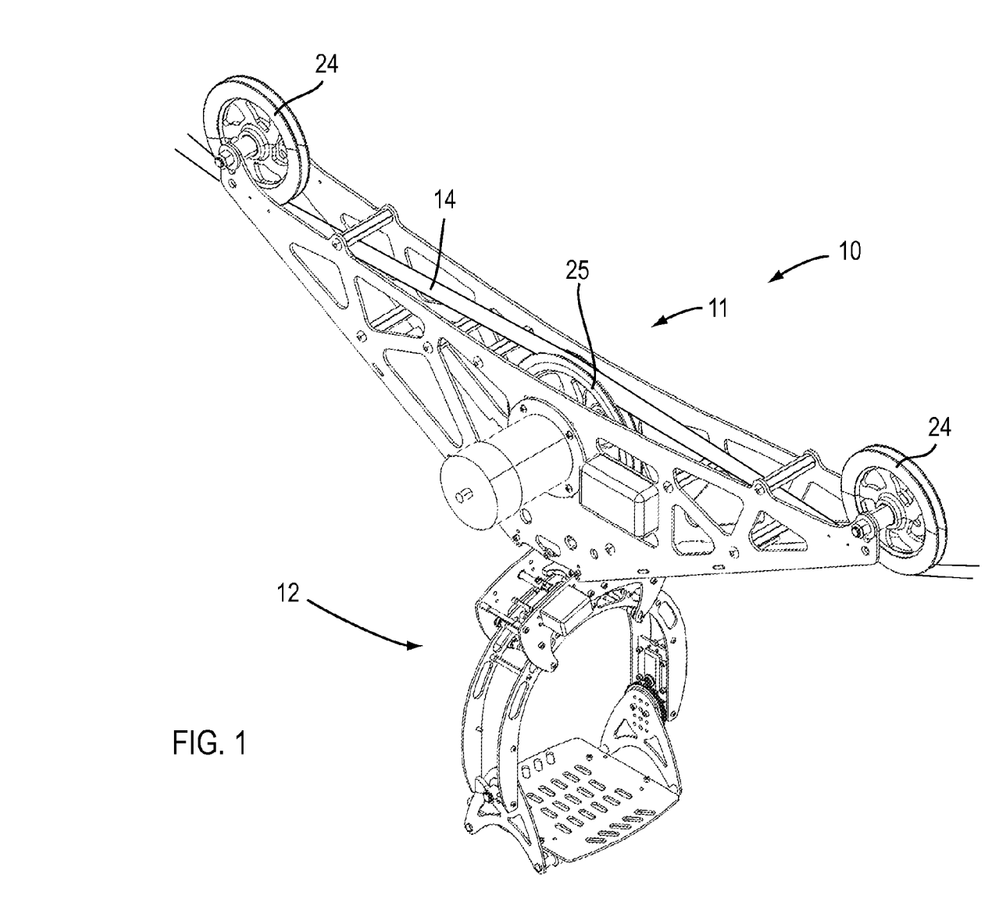
FIG. 1 is a top perspective view of a cable traversing camera carrying device in accordance with the present invention.
Figure 2:
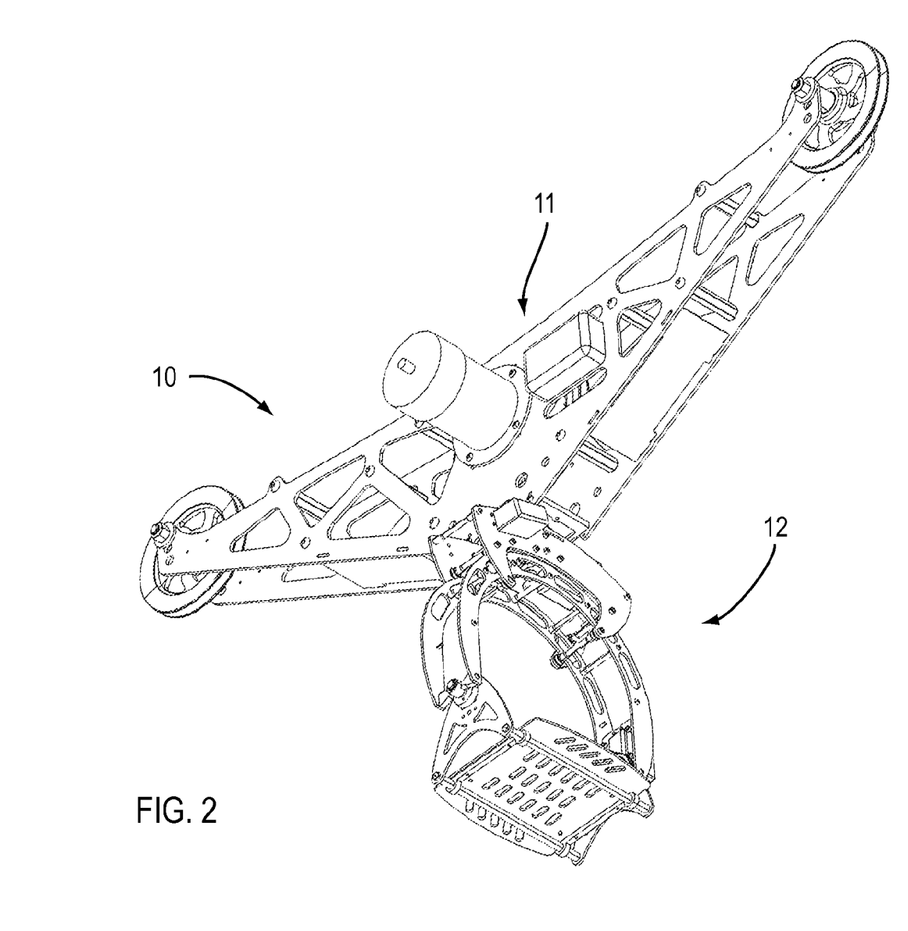
FIG. 2 is a bottom perspective view of the cable traversing camera carrying device of FIG. 1.

Referring to the drawings, FIGS. 1-2 are perspective views that depict a cable traversing camera carrying device 10 in accordance with particular embodiments of the present invention. Generally, a carrying device 10 comprises a manifold 11 and a camera carriage 12. A cable 14 operatively extends through the manifold and engages idler pulleys 24 and the drive pulley 25.

Figure 3:
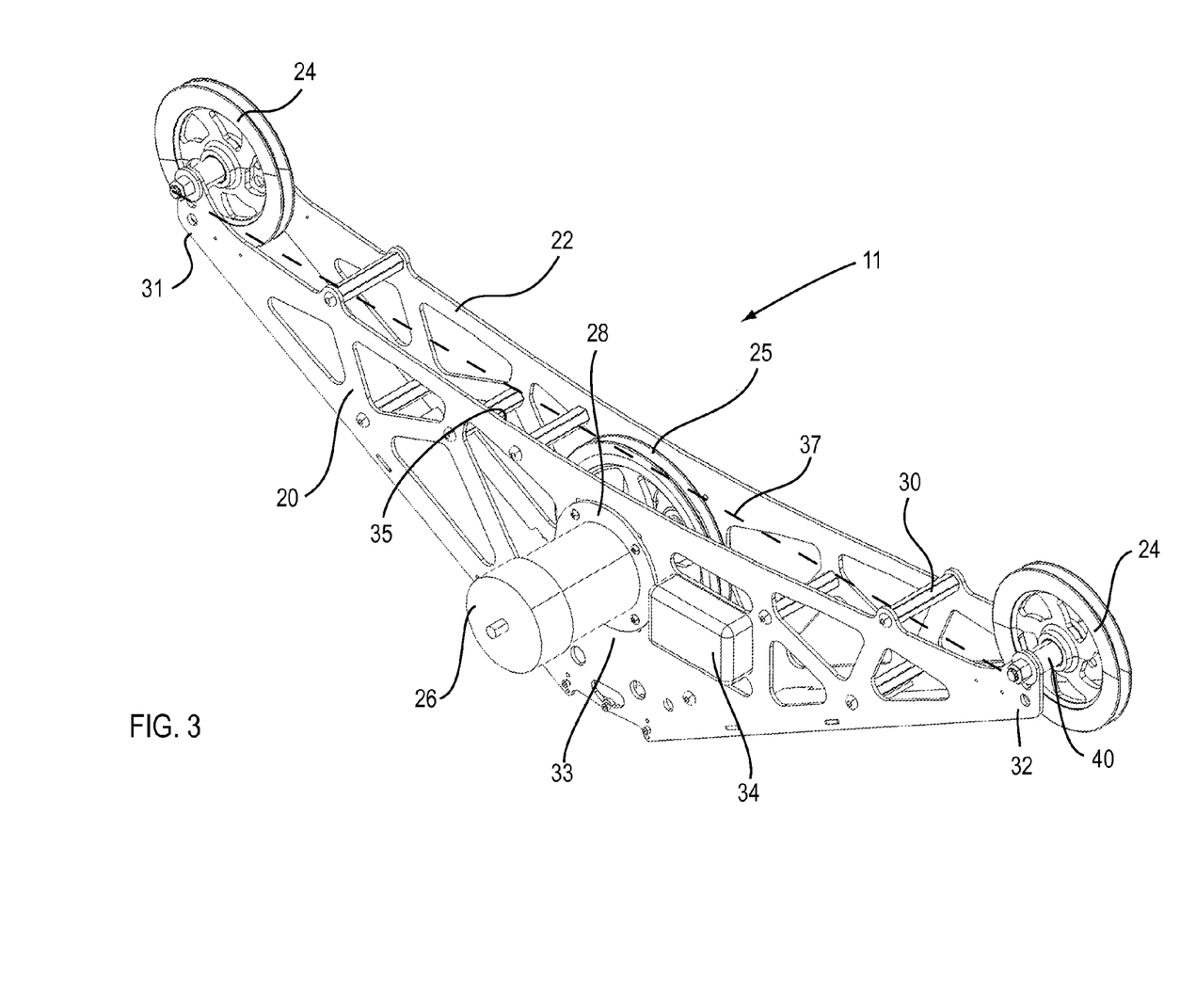
FIG. 3 is a perspective view of a manifold of the cable traversing camera carrying device.
Figure 4:
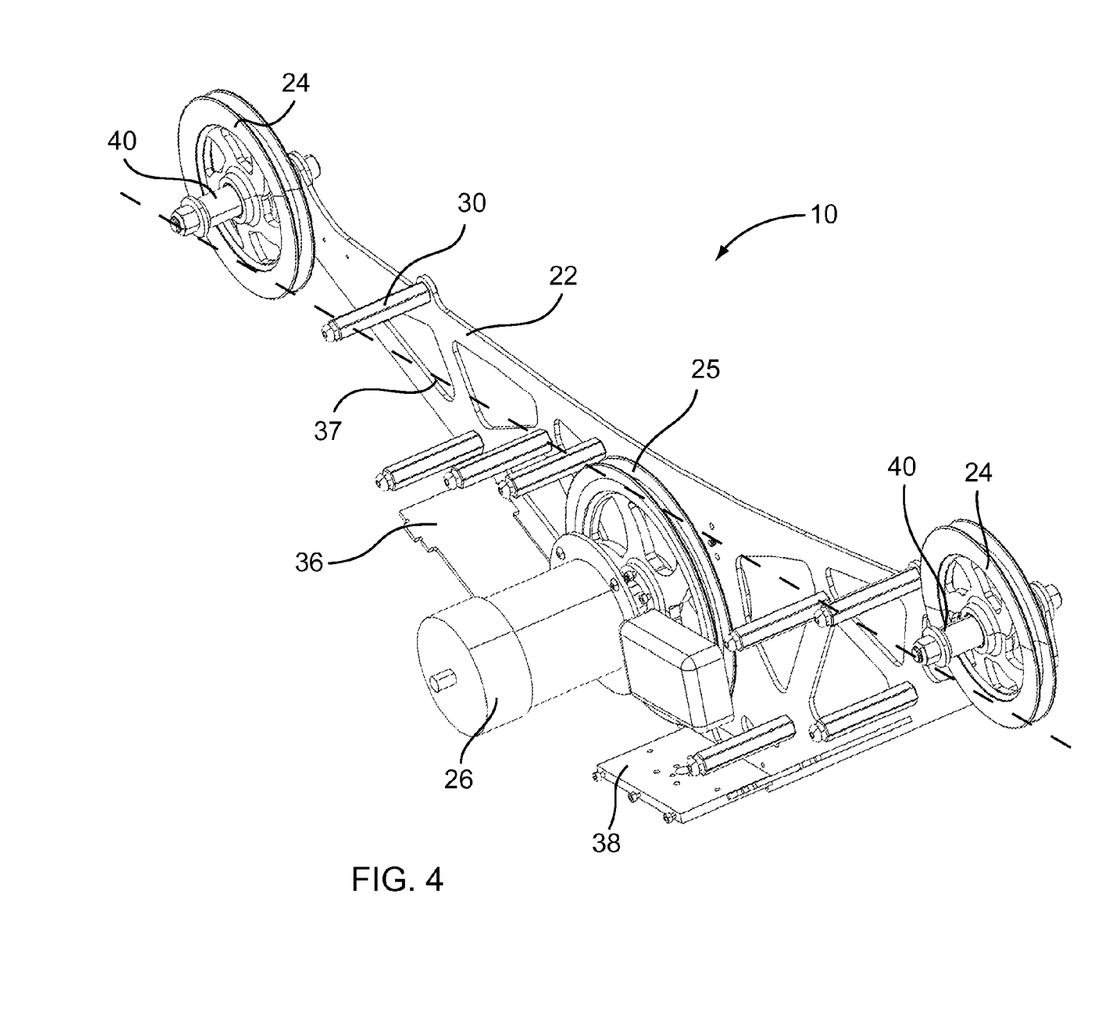
FIG. 4 is a perspective view of the manifold of the cable traversing camera carrying device with a side plate removed to expose the inner components.
Figure 5:
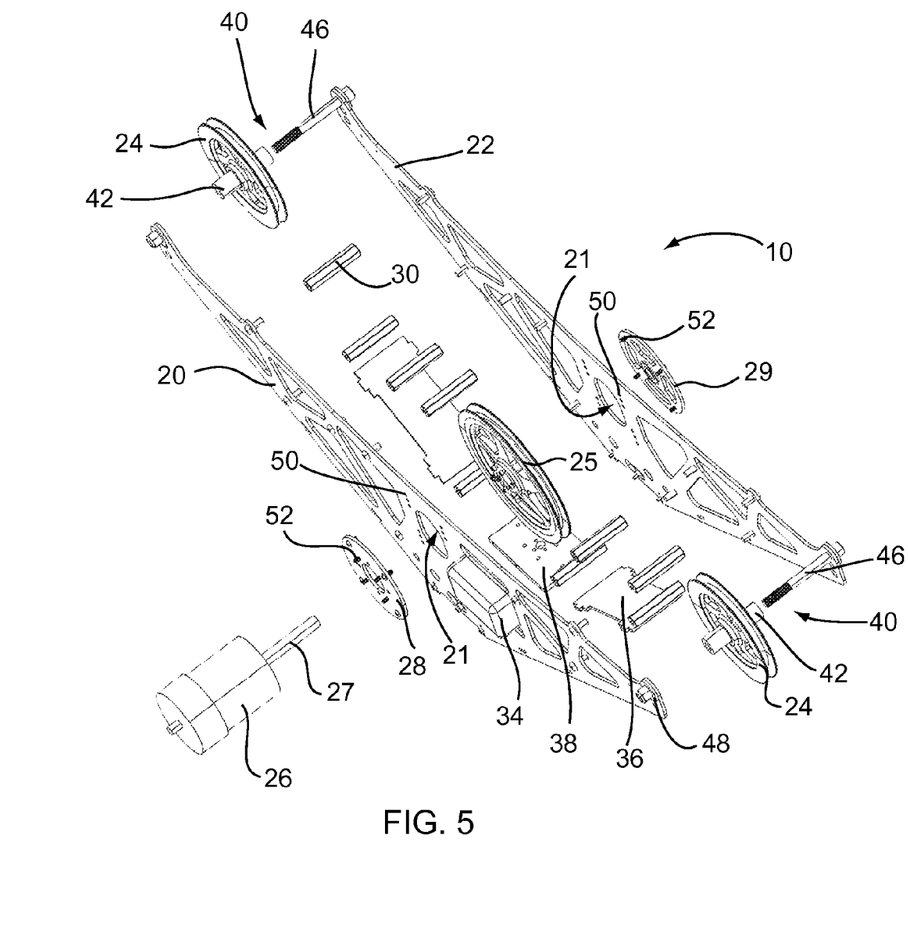
FIG. 5 is an exploded perspective view of the manifold of the cable traversing camera carrying device.

An embodiment of the manifold 11 is shown in greater detail in FIGS. 3-5. FIG. 3 is a perspective view of a manifold 11, FIG. 4 is a perspective view of the manifold 11 with a side plate removed, and FIG. 5 is an exploded perspective view of the manifold 11.

The manifold 11 comprises a first side plate 20 and a second side plate 22. Further, the manifold 11 includes two idler pulleys 24. Each idler pulley 24 is coupled between the first and second side plates 20, 22 and located at opposing sides 31 and 32 of the manifold 11 and adjacent the top side 35 of the manifold 11. The manifold 11 also includes a drive pulley 25 coupled between the first and second side plates 20, 22 and operatively engaged by a remotely activated and controlled motor 26. The drive pulley 25 may be located in a middle portion 33 of the manifold 11 below a line 37 defined between axles 40 of the two idler pulleys 24. Specifically, the axle 27 of the drive pulley 25 may be located below the line 37 between the axels 40 of the two idler pulleys 24. In other embodiments, the reverse is true, wherein the drive pulley 25 may be located in a middle portion 33 of the manifold 11 above a line 37 defined between axles 40 of the two idler pulleys 24. Specifically, the axle 27 of the drive pulley 25 may be located above the line 37 between the axels 40 of the two idler pulleys 24. In other words, the lovation of the drive pulley 25 may be offset from the line 37 defined between axles 40 of the idler pulleys 24.

The two idler pulleys 24 and the drive pulley 25 are adjustable to adjust the tension in a cable 14 operatively extending through the manifold 11 and engaging the idler pulleys 24 and the drive pulley 25. The idler pulley 24 and the drive pulley 25 can be adjusted up and down with respect to the manifold 11. Further the idler pulleys 24 and the drive pulley 25 may be adjusted left to right in order to allow the carrying device 10 to hang vertically on the cable 14. It will be understood that while these pulleys may be adjusted manually by a user moving the axles of the pulleys and then securing them in the desired position within the manifold 11, other forms of adjustment are contemplated, such as the use of a jack screw. Further, it is contemplated that the manifold may use spring tensioners to automatically adjust the pulleys to a predetermined tension of the cable 14. In fact, it is contemplated any type of adjustment mechanism, device, or configuration may be utilized to adjust the pulleys.

The motor 26 may include drive pulley axle 27, wherein the motor is a bidirectional motor. The motor 26 is remotely activated, such as with a remote control radio or the like. The motor 26 turns the axle 27. In operation, the drive pulley 25 is coupled to the axle 27, such that the drive pullet 25 and the axle 27 are in a fixed orientation with each other. In this condition, the rotation of the axle 27 results in the rotation of the drive pulley 25. The drive pulley 25 engages the cable 14 as shown in FIG. 1. In particular embodiments, the drive pulley 25 includes a friction surface (not shown) within the channel that engages the cable 14. The friction surface of the drive pulley 25 operates to limit slippage of the drive pulley 25 while the carrying device traverses the cable 14.

Rotation of the motor 26 in a first direction 60 results in the rotation of the drive pulley 25 in the same direction. The rotation of the drive pulley 25 in the first direction 60 results in the movement of the carrying device 10 along the cable 14 in a first direction 62. Rotation of the motor 26 in a second direction 64 results in the rotation of the drive pulley 25 in the same direction. The rotation of the drive pulley 25 in the second direction 64 results in the movement of the carrying device 10 along the cable 14 in a second direction 66. During movement of the carrying device 10, the idler pulleys 24 support the weight of the carrying device 10 on the cable 14 and further the idler pulleys are free to rotate in any direction. In this way, the cable 14 operatively extends through the manifold 11 and engages idler pulleys 24 and the drive pulley 25.

In other embodiments, the motor 26 may not include an axle 27, but rather, the motor 26 may be operatively engaged with the drive pulley 25. For example, and without limitation, the motor 26 may be operatively engaged with the drive pulley by use of a gear configuration, wherein interconnected gears are utilized to rotated the drive pulley 25 in each direction.

The motor 26 may be electronically connected to a controller 34. The controller receives signals from the remote control radio and operates to control the motor 26 and thereby control movement of the carrying device 10.

Looking closer at the idler pulleys 24, they operate on an axle 40. The axle 40 may include a fixed axle portion 46 that extends through a spacer 42. The spacer 42 is removably secured to the idler pulley 24 and the spacer 42 rotates about the fixed portion 46. The fixed portion 46 of the axle 40 extends through corresponding apertures 48 in each the first and second plates 20, 22. The fixed portion 46 of the axle 40 may be adjusted within these apertures 48 and then secured in a user selected position. In at least this way, the idler pulley 24 is adjustable. It will also be understood that the idler pulleys 24 may either be adjustable independent of each other or have a matched adjustment.

It will also be understood that while the idler pulley 24 is shown operating with an axle having a fixed portion 46 and a spacer 42 rotating around the fixed portion 46, other embodiments may be utilized. For example, the idler pulley 24 may be fixed to an axle, wherein the axle rotates with respect to the manifold. Further, other embodiments may include the use of bearing or the like to effectuate rotation of the idler pulley 24.

Looking closer at the drive pulley 25, it operates on axle 27 that is operatively coupled to the motor 26. The drive axle 27 extends through corresponding apertures 21 in the first and second plates 20, 22. The drive axle 27 may be adjusted within these apertures 21 and then secured in a user selected position. The user may secure the axle 27 and the drive pulley to the manifold 11 by use of motor plate 28 and axle plate 29. The motor plate 28 may be coupled to the motor 26 and then coupled to the first plate 20 by use of bolts 52 that couple to apertures 50 in the first plate 20. Likewise, the axle plate 59 may be secured to the axle 27 and the second plate 22 by use of bolts 52 that couple to apertures 50 in the second plate 22. In at least this way, the drive pulley 25 is adjustable.

In order to maintain proper spacing between the first and second plates 20, 22, the manifold 11 includes a plurality of spacers 30 coupled between the plates 20, 22. For example, and without limitation, the spacers 30 may be sixed and differently in order to adjust the spacing between the first and second plates 20, 22. Further, the manifold 11 comprises battery plates 36 coupled between the first and second plates 20, 22 in order to retain rechargeable batteries within the manifold 11. Additionally, the manifold 11 comprises a carriage mount 38, wherein the carriage mount 38 functions to allow operative coupling of the camera carriage 12 to the manifold 11 to form a carrying device 10.

While shown in the drawing figures that the manifold 11 if formed by connecting a first and second plate 20, 22, other manifolds 11 may be utilized, wherein the manifold 11 is a single unitary component or a combination of other components, so long as it operates within the scope of the function as claimed.

Further, in order to balance the carrying device 10 on the cable 14, it may require additional components. For example one or more gyroscopes may be coupled to the manifold 11 in order to balance the carrying device 10 on the cable during operation.

Figure 6:
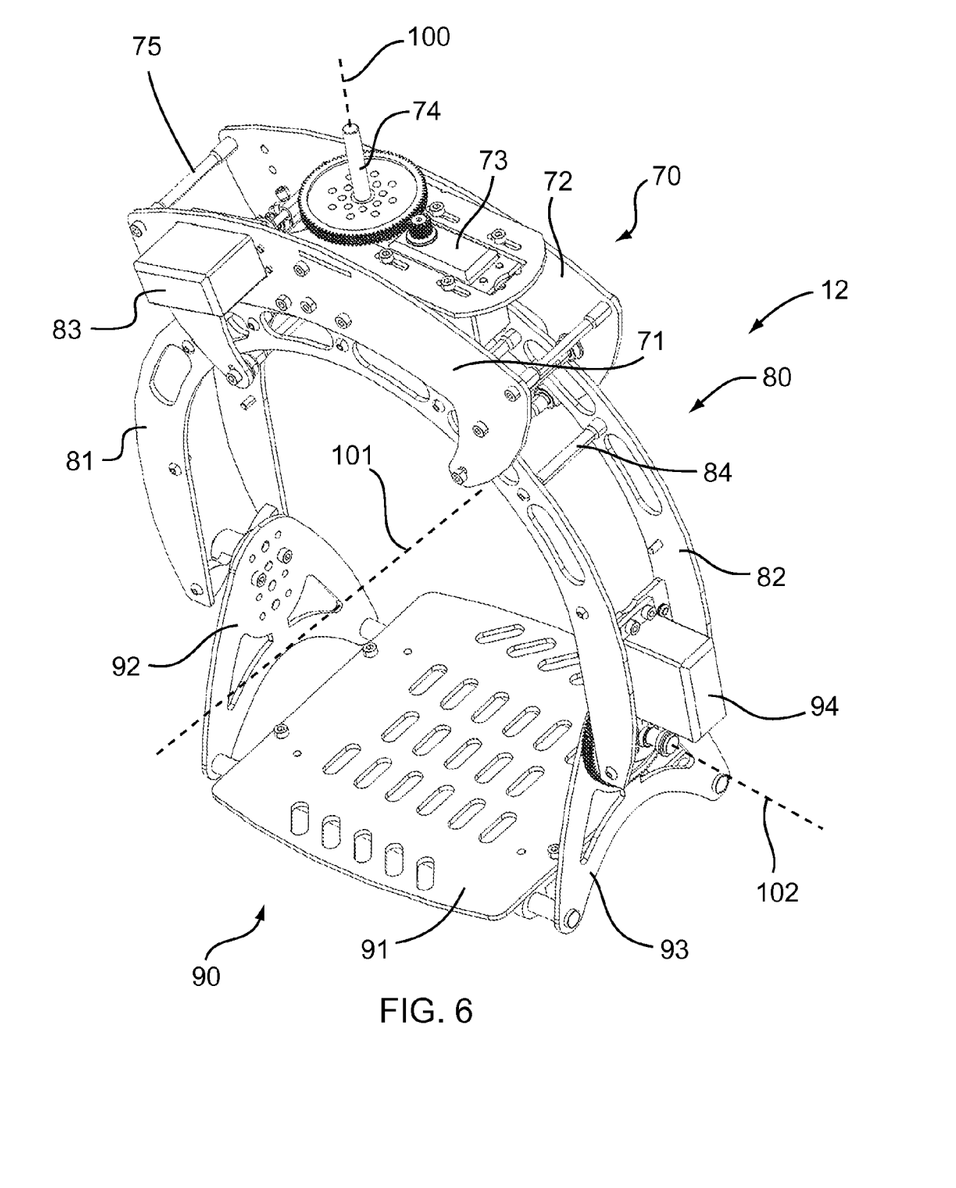
FIG. 6 is a perspective view of the camera carriage of the cable traversing camera carrying device.

Referring again to the drawings, FIG. 6 depicts a camera carriage 12 according to embodiments of the present invention. The camera carriage 12 includes a manifold mount portion 70; an arch portion 80; and a camera mount 90. The camera carriage 12 is rotatable about three axes.

The manifold mount portion 70 includes a first plate 71 coupled to a second plate 72 with spacers 75 coupled between the first and second plates 71, 72. The manifold mount 70 further includes a manifold servo 72 that is operatively coupled to shaft 74 by use of gears. The shaft 74 is rotatably coupled to the carriage mount 38. The manifold servo 72 may rotate in response to a signal received by a remote control radio. The rotation of the manifold servo 72 results in the rotating of the manifold mount 70 about the shaft 74 having an axis 100 and thereby the camera carriage 12 is rotatable about the axis 100.

The arch portion 80 comprises a first plate 81 coupled to a second plate 82 with spacers 84 coupled between the first and second plates 81, 82. The arch portion 80 is slidingly coupled to a lower portion of the manifold mount 70. An arch servo 83 operates in response to a signal received from a remote control radio to move the arch portion 70 along an arc within the manifold mount 70. This arcuate sliding of the arch portion 80 results in the rotation of the arch portion about axis 101.

The camera mount 90 comprises a camera plate 91, a first side plate 92 and a second side plate 93. The camera mount 90 is rotatably coupled to the arch portion 80. The camera servo 94 operates in response to receiving a signal from a remote control radio and rotates the camera mount 90 about axis 102 by use of gears. A camera is mountable in a fixed position to the camera plate 91.

Because the manifold mount portion 70, arch portion 80 and camera mount 90 are interconnected and each are rotatable by operation of a servo, the camera that is mounted to the camera plate is rotated to any number of user determined orientations and angles. This may occur during traversing of the manifold 11 along the cable 14.

Accordingly, the components defining any cable traversing camera carrying device may be formed of any of many different types of materials or combinations thereof that can readily be formed into shaped objects provided that the components selected are consistent with the intended operation of a cable traversing camera carrying device. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any cable traversing camera carrying device may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

Figure 7:
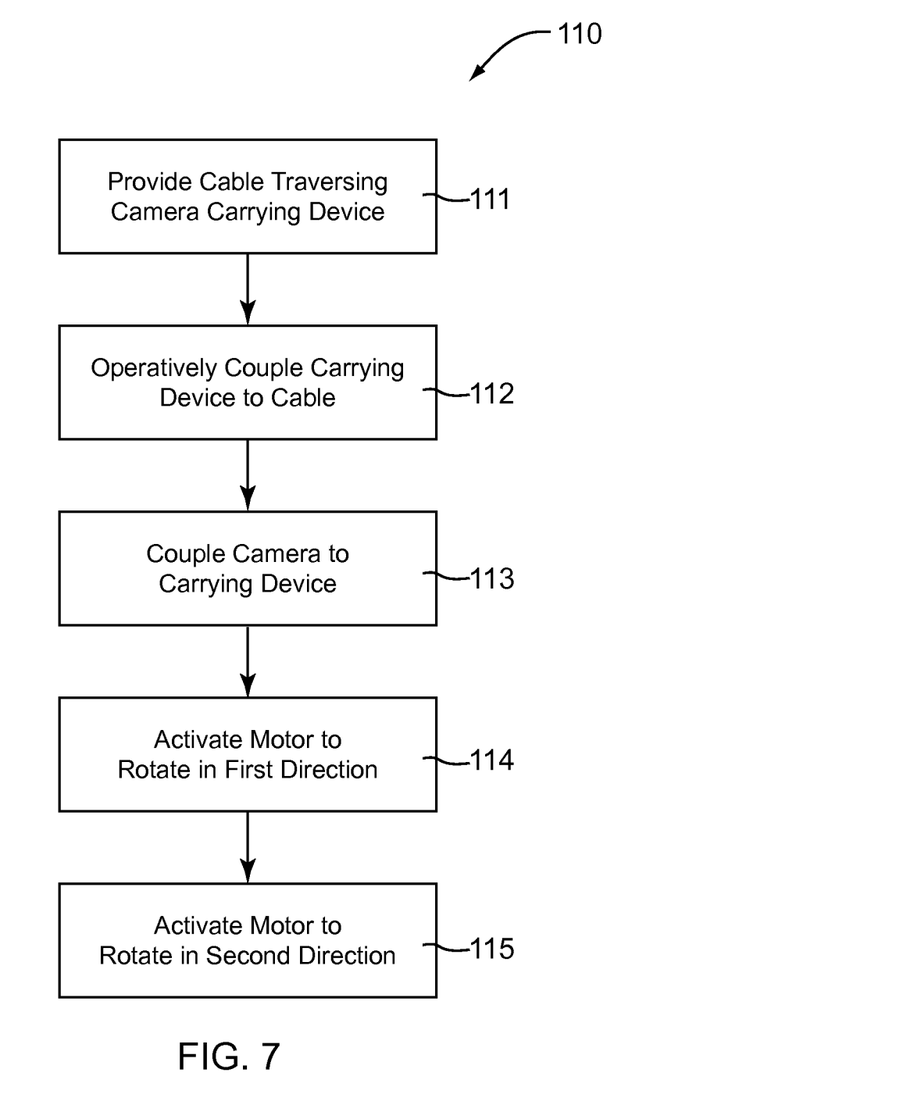
FIG. 7 is a flow chart of a method of using a cable traversing camera carrying device.

Referring again to the drawings, FIG. 7 is a flow chart of a method 110 of using a cable traversing camera carrying device. The method 110 includes providing a cable traversing camera carrying device (Step 111); operatively couple the cable traversing camera carrying device to a cable (Step 112); repeatably and removably couple a camera that is operatively coupled to the carrying device (Step 113); remotely activating a motor to rotate in a first direction, wherein the carrying device traverses the cable in a first direction in response to the motor rotating in the first direction (Step 114); and remotely activating a motor to rotate in a second direction, wherein the carrying device traverses the cable in a second direction in response to the motor rotating in the second direction (Step 115).

The method 110 at Step 111 may further include the idler pulleys supporting the weight of the device on the cable; and adjusting the idler pulleys and the drive pulleys to obtain a desired cable tension.

The method 110 may further comprise balancing the device on the cable; providing at least one gyroscope to balance the device on the cable; rotating the camera carriage about at least one axes; and remotely operating a camera coupled to the camera carriage.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A cable traversing camera carrying device comprising:
    a manifold including:
        two idler pulleys, each coupled between the first and second side plates located at opposing sides of the manifold and adjacent the top side of manifold; and
        a drive pulley coupled operatively engaged by a remotely activated and controlled motor, the drive pulley located in a middle portion of the manifold offset from a line defined between axes of the two idler pulleys, wherein the two idler pulleys and the drive pulley are adjustable to adjust the tension in a cable operatively extending through and engaging the idler pulleys and the drive pulley; and
    a camera carriage coupled to the manifold.

2. The device of claim 1, wherein motor is a bi-directional motor.

3. The device of claim 2, wherein wherein the drive pulley rotates in a first and second direction in response to the motor rotating in a first and second direction.

4. The device of claim 3, wherein the device traverses the cable in response to rotation of the drive pulley.

5. The device of claim 1, wherein the idler pulleys are adjustable up, down, left and right.

6. The device of claim 1, wherein the drive pulley is adjustable up, down, left and right.

7. The device of claim 1, wherein camera carriage is rotatable about three axes.

8. A method of using a cable traversing camera carrying device comprising:
    providing a cable traversing camera carrying device;
    operatively couple the cable traversing camera carrying device to a cable;
    wherein operatively coupling the device to the cable comprises idler pulleys supporting the weight of the device on the cable
    repeatably and removably couple a camera that is operatively coupled to the carrying device;
    remotely activating a motor to rotate in a first direction, wherein the carrying device traverses the cable in a first direction in response to the motor rotating in the first direction; and
    remotely activating a motor to rotate in a second direction, wherein the carrying device traverses the cable in a second direction in response to the motor rotating in the second direction.

9. The method of claim 8, wherein operatively coupling the device to the cable further comprises adjusting the idler pulleys and drive pulleys to obtain a desired cable tension.

10. The method of claim 8, further comprising balancing the device on the cable.

11. The method of claim 10, further comprising providing at least one gyroscope to balance the device on the cable.

12. The method of claim 8, further comprising rotating the camera carriage about at least one axes.

13. The method of claim 8, further comprising remotely operating a camera coupled to the camera carriage.

14. A cable traversing camera carrying device comprising:
  a manifold comprising:
    a first side plate and a second side plate;
    two idler pulleys, each coupled to opposing sides of the manifold and adjacent the top side of manifold; and
    a drive pulley operatively engaged by a remotely activated and controlled motor, the drive pulley located in a middle portion of the manifold below a line defined between axes of the two idler pulleys, wherein the two idler pulleys and the drive pulley are adjustable to adjust the tension in a cable operatively extending through and engaging the idler pulleys and the drive pulley; and
  a camera carriage operatively coupled to the manifold, wherein the camera carriage is rotatable about at least one axis.

15. The device of claim 14, wherein the camera carriage comprises a manifold mount portion, an arch portion and a camera mount.

16. The device of claim 15, wherein the manifold mount portion is rotatable about a first axis in response to operation of a manifold servo.

17. The device of claim 15, wherein the arch portion is rotatable about a second axis in response to operation of an arch servo.

18. The device of claim 15, wherein the camera mount is rotatable about a third axis in response to operation of a camera servo.

19. The device of claim 14, wherein the device traverses the cable in response to rotation of the drive pulley.

* * * * *